US008255831B2

(12) United States Patent  
Araumi

(10) Patent No.: US 8,255,831 B2  
(45) Date of Patent: Aug. 28, 2012

(54) FILE MANAGEMENT SYSTEM, FILE MANAGEMENT APPARATUS, AND PLACE MAP GENERATING METHOD

(75) Inventor: Yuichi Araumi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 440 days.

(21) Appl. No.: 12/556,938

(22) Filed: Sep. 10, 2009

(65) Prior Publication Data  
US 2010/0070919 A1   Mar. 18, 2010

(30) Foreign Application Priority Data  
Sep. 17, 2008   (JP) ................................ 2008-238458

(51) Int. Cl.  
*G06F 3/048* (2006.01)
(52) U.S. Cl. .......................... 715/835; 715/810; 715/826
(58) Field of Classification Search ................... 715/835  
See application file for complete search history.

(56) References Cited

U.S. PATENT DOCUMENTS

| | | | | |
|---|---|---|---|---|
| 6,335,742 B1* | 1/2002 | Takemoto | .................... | 715/781 |
| 6,700,612 B1* | 3/2004 | Anderson et al. | ........ | 348/333.11 |
| 7,051,282 B2* | 5/2006 | Marcjan | ........................ | 715/743 |
| 7,580,143 B2 | 8/2009 | Araumi | | |
| 7,778,973 B2* | 8/2010 | Choi et al. | .................... | 707/628 |
| 7,810,046 B2* | 10/2010 | Hiraoka et al. | ............... | 715/810 |
| 2005/0246428 A1 | 11/2005 | Araumi | | |
| 2008/0040690 A1* | 2/2008 | Sakai | ........................... | 715/853 |
| 2008/0228937 A1 | 9/2008 | Araumi | | |

FOREIGN PATENT DOCUMENTS

| | | |
|---|---|---|
| JP | 11-96194 | 4/1999 |
| JP | 2006-268295 | 10/2006 |

* cited by examiner

Primary Examiner — Alvin Tan  
(74) Attorney, Agent, or Firm — Oblon, Spivak, McClelland, Maier & Neustadt, L.L.P.

(57) ABSTRACT

When registration operation for a new place is performed, the client terminal sends registration information along with a user ID to the file management server. The file management server extracts the number of layers and the number of places from the place map information. The file management server computes a layer close to the center of the place map information from the extracted number of layers. Next, the file management server retrieves a place of which the place name is not registered. Moreover, the file management server computes and acquires the distance of the retrieved place, and registers the registration information for the new place in the place having the shortest distance.

4 Claims, 15 Drawing Sheets

FIG. 4

```
<?xml version="1.0" encoding="utf-8" ?>
<placeMap updateTime="2007-08-10T12:54:00+09:00" preCurrentID="My place">
    <layer name="No Name" tag="">
        <place ID="">               ←202
        <place ID="">
        <place ID="">
    </layer>
    201
    <layer name="FAVORITE" tag="FAVORITE; PHOTOGRAPH">
        <place ID="">
        <place ID="My place">
        <place ID="">
    </layer>
    <layer name="" tag="">
        <place ID="">
        <place ID="">
        <place ID="">
    </layer>
</placeMap>
```

FILE MANAGEMENT SYSTEM, FILE MANAGEMENT APPARATUS, AND PLACE MAP GENERATING METHOD

CROSS-REFERENCE TO RELATED APPLICATIONS

The present application claims priority to and incorporates by reference the entire contents of Japanese Patent Application No. 2008-238458 filed in Japan on Sep. 17, 2008.

BACKGROUND OF THE INVENTION

1. Field of the Invention

The present invention relates to a file management system, a file management apparatus, and a place map generating method. Particularly, the present invention relates to a file management system in which a user can visually manage files.

2. Description of the Related Art

Along with the popularization of information equipment such as PCs (Personal Computers), digital cameras, or mobile telephones, documents or images are generally being digitized so that they can be handled in the information equipment (hereinafter, a digitized document or image is referred to as a "file"). A file such as a digitized document or image is managed by information equipment. A user can retrieve and operate a desired file by operating the information equipment.

For example, in Windows (registered trademark) used as an OS (Operating System) of PCs and the like, files are managed by using a tree structure that is defined by a hierarchical relationship between folders. Therefore, a desired file can be retrieved generally by tracing the tree structure in a top-down or bottom-up manner.

Furthermore, intuitive file management has been conventionally performed by visualizing files or folders for classifying the files and arranging them as thumbnail images or icons. For example, there has been known a user interface display that arranges icons of a plurality of folders belonging to an upper hierarchy on the upper portion of a screen in a horizontal direction, arranges thumbnail images of a plurality of files belonging to a lower hierarchy of one folder, among the folders displayed on the upper portion of the screen, in the middle and lower portions of the screen, and displays a specific thumbnail image among the thumbnail images to be larger than the other thumbnail images. In this way, a user can easily understand ideality between an operation and a scrolling process for thumbnail images. The user interface display has been known as disclosed in, for example, Japanese Patent Application Laid-open No. 2006-268295.

The user interface display develops file management in a direction of depth because a file management unit is a folder in a tree structure. Therefore, there is a problem in that the more a folder is located deeper in the hierarchy, the more complicated an operation for arriving at the folder becomes. Moreover, a folder corresponding to a specific node and a folder corresponding to another node, in which the nodes constitute a tree structure, are located at different positions (hierarchies). Therefore, it is difficult to intuitively grasp the relationship between both folders.

In this regard, this applicant has provided file management apparatus that displays a plurality of place images acting as a file management unit on a displaying means in a matrix configuration, determines whether one place image is selected from the displayed place images, and displays a thumbnail image of a file registered in association with the one place image on the displaying means. Therefore, a user can intuitively grasp the relationship between file management units and can effectively perform file management. The file management apparatus has been known as disclosed in, for example, Japanese Patent Application No. 2008-124060.

FIG. 14 is a diagram illustrating an example of a file management screen displayed on a display of a client computer connected to the file management apparatus via a network, on which files managed by the file management apparatus are displayed. As illustrated in FIG. 14, the display displays areas (places) P, in which files are registered, in the shape of a matrix and displays layer name areas L1, of which each indicates a layer for managing places located in the same row, next to the areas P in a longitudinal direction (place map screen). In this case, in the place map screen, the matrix of the places consisting of layers having a multiple-stage configuration is referred to as "a place matrix".

The title of the middle-stage layer name area L1 is set to "favorite". The titles of the other layer name areas L1 are not set and are displayed as "not set". The attribute of place and the name of place, which are indices for characterizing each place input by a user, are registered in the area P located in the central part of the middle-stage layer. In this case, the name of place is registered as "My Place". Moreover, the other areas P do not have the attribute of place and the name of place and display thereon "New Place!". The files managed by the file management apparatuses can be registered in association with only the area P in which the attribute of place and the name of place are registered. That is to say, in the example illustrated in FIG. 14, files can be registered in association with only the area P of the place name "My Place" among the areas P that are arranged in the shape of a matrix.

The client computer should register the attribute of place and the name of place in an area P. In other words, the client computer should create a new place in order to register a file to be managed by the file management apparatus in association with the area P. In the creation of the new place, when the new place is created in an area P that is located in the end of the place matrix (3*3 matrix) on the place map screen, the file management apparatus reconfigures the place matrix and adds an unregistered place row (layer) or an unregistered place column to the outer part of the place matrix to expand the place matrix.

FIG. 15 is a diagram illustrating a place matrix reconfigured when the attribute of place and the name of place are registered in the area P belonging to the most significant row of the place matrix before reconfiguration. As illustrated in FIG. 15, when the attribute of place and the name of place (Family) are registered in the area P located in the central portion of the most significant layer in the place matrix illustrated in FIG. 14, the place matrix is reconfigured so that one unregistered place row (layer) is newly added to the outer part of matrix.

FIG. 16 is a diagram illustrating a place matrix reconfigured when the attribute of place and the name of place are registered in the area P belonging to the rightmost column of the place matrix before reconfiguration. As illustrated in FIG. 16, when the attribute of place and the name of place (CPS-PT) are registered in the area P located in the central portion of the rightmost end in the place matrix illustrated in FIG. 14, the place matrix is reconfigured so that one unregistered place column is newly added to the outer part of matrix.

FIG. 17 is a diagram illustrating a place matrix reconfigured when the attribute of place and the name of place are registered in the area P belonging to the least significant row and the rightmost column of the place matrix before reconfiguration. As illustrated in FIG. 17, when the attribute of place and the name of place (CPS-PT) are registered in the area P located in the rightmost column of the least significant row in the place matrix illustrated in FIG. 14, the place matrix is reconfigured so that an unregistered place row (layer) and place column are newly added to the outer part of matrix.

To create a new place in a desired area P on a place matrix, the client computer executes dedicated software that can handle position information for the area.

Conversely, because position information of each area on the place map screen cannot be handled in a client computer, MFP (Multi Function Peripheral), a digital camera, or the like (hereinafter, "client computer or the like") that does not have dedicated software installed therein, position information for displaying a place map on the created new place cannot be set. Therefore, a newly created place is automatically arranged in a middle-stage layer on the place map screen. That is to say, when the client computer or the like that does not have the dedicated software installed therein creates a new place, the attribute of new place and the name of the new place are automatically registered in an area P located in the middle-stage layer. At this time, when the area P is located in the rightmost column in the place matrix, an unregistered place column is newly added to the outer part as illustrated in FIG. 16.

The client computer that does not have the dedicated software installed therein does not have a problem when the number of new places created by the client computer is few. However, when many new places are created, there is a problem that place columns are added to the outer part in accordance with the number of new places on the place map screen and thus file management is complicated because all the new places are arranged in the middle-stage layer in a transverse direction.

SUMMARY OF THE INVENTION

It is an object of the present invention to at least partially solve the problems in the conventional technology.

According to an aspect of the present invention, there is provided a file management system including a plurality of client terminals and a file management apparatus that is connected to the client terminals via a network. The client terminal includes a first sending unit that sends a file to the file management apparatus; and a second sending unit that sends a generation request for generation of file management information for managing the file to the file management apparatus. The file management apparatus includes a generating unit that generates the file management information upon receiving the generation request from the client terminal; a first storage unit that receives the file from the client terminal and stores therein the file, the file management information associated with the file, and position information by which a displaying unit displays symbol images for the file management information in the shape of a matrix; and a display control unit that causes the displaying unit display the symbol images in the shape of a matrix based on the position information.

According to another aspect of the present invention, there is provided a file management apparatus connected to a plurality of client terminals via a network. The file management apparatus includes a generating unit configured to generate file management information upon receiving a generation request for generation of file management information for managing a file from the client terminal; a first storage unit configured to receive a file from the client terminal and to store therein the file, the file management information associated with the file, and position information by which a displaying unit displays symbol images for the file management information in the shape of a matrix; and a display control unit configured to cause the displaying unit display the symbol images in the shape of a matrix based on the position information.

According to still another aspect of the present invention, there is provided a place map generating method implemented on a file management apparatus connected to a plurality of client terminals via a network. The place map generating method including managing data for use in creation of a place map for every user using the client terminals and managing data of place when the place map is to be displayed in a storage unit; upon receiving an instruction from a user among the plurality of users via a client device among the client device, acquiring data for use in creation of a place map for that user and data of place from the storage unit, and creating a place map by using acquired data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of placeMap.xml;

DETAILED DESCRIPTION OF THE PREFERRED EMBODIMENTS

Exemplary embodiments of the present invention will be explained in detail below with reference to the accompanying drawings. However, the present invention is not limited to these embodiments.

Figure 1:
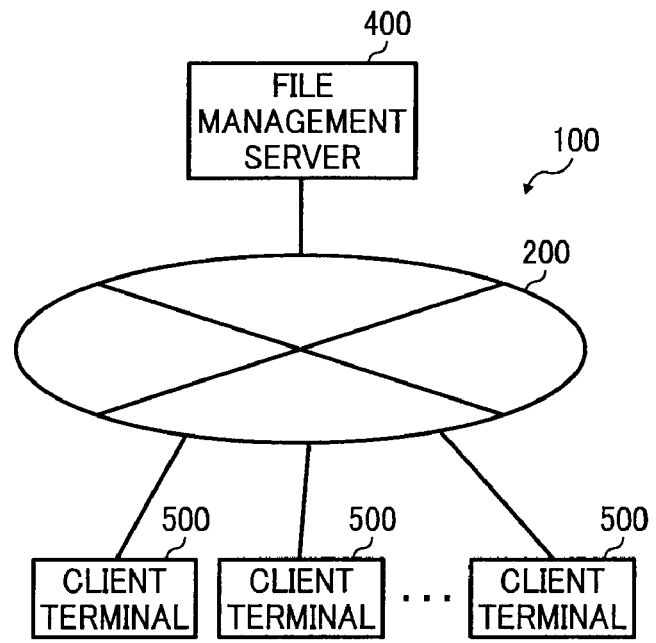
FIG. 1 is a schematic diagram illustrating the configuration of a file management system according to an embodiment of the present invention.

FIG. 1 is a schematic diagram illustrating the configuration of a file management system 100 according to the present embodiment. The file management system 100 includes a plurality of client terminals 500, a file management server 400, and a network 200 to which the client terminals 500 and the file management server 400 are communicated. The client terminals 500 can be PCs or MFPs. The file management server 400 manages files or folders uploaded from the client terminals 500 via the network 200.

Figure 14:
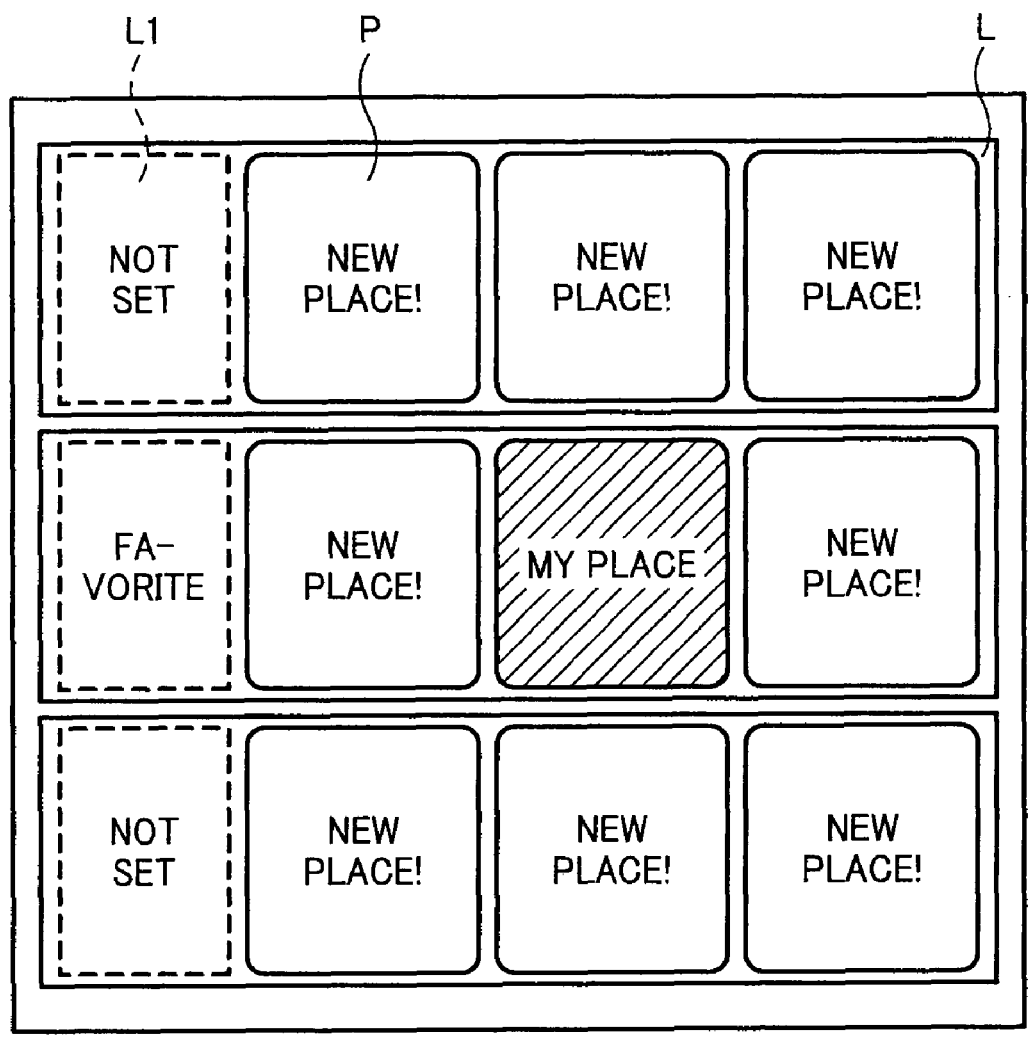
FIG. 14 is a diagram illustrating an example of a file management screen displayed on a display of a client computer connected to a file management apparatus via a network, on which files managed by the file management apparatus are displayed.

The file management server 400 can manage files uploaded from the client terminals 500 by using places arranged in the shape of a matrix as illustrated in FIG. 14 similarly to the conventional file management apparatus. On the other hand, the client terminal 500 does not include a means for displaying the place map screen illustrated in FIG. 14. Therefore, as described below, the client terminal 500 communicates with the file management server 400 via a general browser and uploads files.

Figure 2:
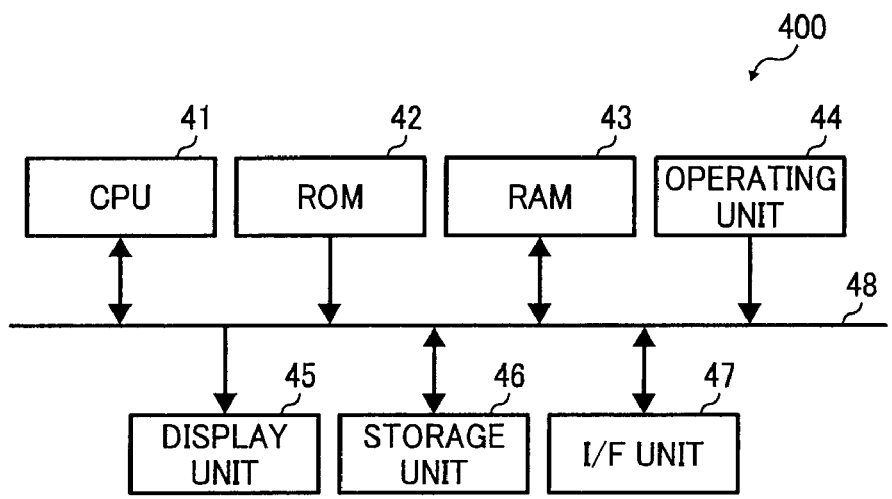
FIG. 2 is a hardware configuration diagram of a file management server shown in FIG. 1.

FIG. 2 is a hardware configuration diagram of the file management server 400. The file management server 400 includes a CPU 41, a ROM 42, a RAM 43, an operating unit 44, a display unit 45, a storage unit 46, an interface (I/F) unit 47, and a bus 48. The CPU 41 executes a computer program to control the whole of the server and realizes each function unit (see FIG. 5) that will be described below. The ROM 42 stores therein a computer program and various types of data. The RAM 43 stores therein a computer program loaded by the CPU 41. The operating unit 44 includes input devices such as a mouse and/or a keyboard. The display unit 45 is a display device such as a liquid crystal monitor that displays the place map screen illustrated in FIG. 14. The storage unit 46 is a storage device such as HDD (Hard Disc Drive) that stores therein various types of computer programs and data. The I/F unit 47 is a sending unit that sends thumbnail images or comment data, to be described below, to the client terminal 500. The bus 48 interconnects these units.

The storage unit 46 stores and manages files sent from a user (the client terminal 500). The storage unit 46 further stores and manages configuration information such as file management information (a place ID folder to be described below: see FIG. 3) indicative of the configuration unit of file management by using a predetermined folder structure obtained by associating the sent files with the configuration information.

Figure 3:
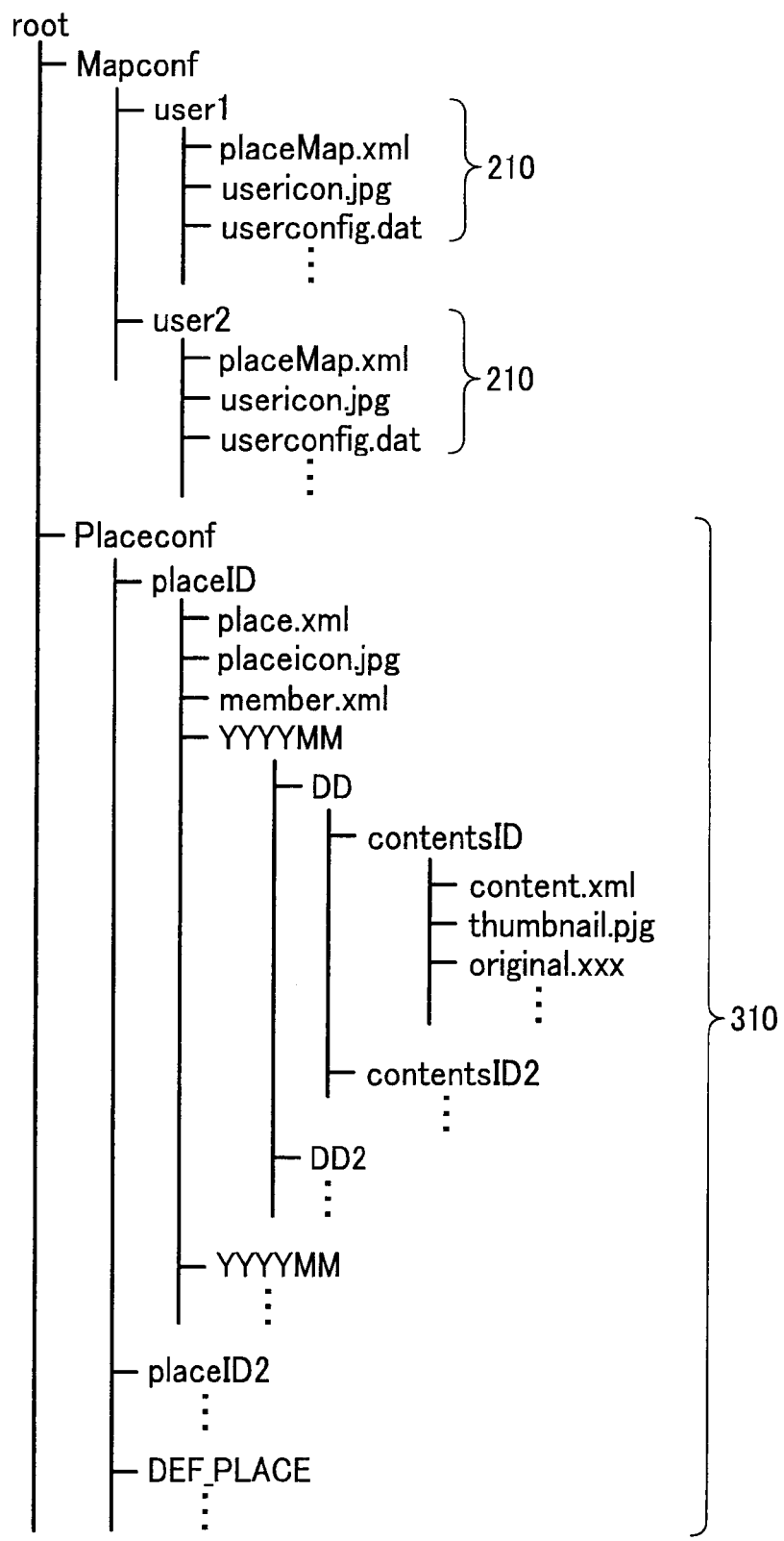
FIG. 3 is a diagram illustrating a folder structure by which configuration information is managed.

Next, an explanation will be given about a management structure of configuration information such as file management information (a place ID folder to be described below: see FIG. 3) stored in the storage unit 46 illustrated in FIG. 2. FIG. 3 is a diagram illustrating a folder structure by which the configuration information stored in the storage unit 46 is managed. As illustrated in FIG. 3, the storage unit 46 has a tree folder structure for maintaining the configuration information. The folder structure includes a map management part 210 that contains configuration information for displaying the place map screen illustrated in FIG. 14 and a place management part 310 that contains configuration information for the area P (place) illustrated in FIG. 14.

A Mapconf folder of the map management part 210 is a root folder of the map management part 210. The Mapconf folder includes user folders (user1, user2) prepared for every user (user ID) that utilizes the file management system 100. The user folders store configuration information (place map information: placeMap.xml) for a user ID corresponding to a user folder name, which is used for displaying the place map screen illustrated in FIG. 14. The user folders further store "userConfig.dat" for recording user-related information such as an icon image (usericon.jpg) for the user ID, the name or contact address (for example, E-mail address) of the user of the user ID.

FIG. 4 is a diagram illustrating an example of the contents of placeMap.xml that is configuration information used for displaying the place map screen illustrated in FIG. 14. As illustrated in FIG. 4, placeMap.xml is described in an XML format (see the first line). The tag of the second line describes time and data (updateTime) when the placeMap.xml is updated and the place name (preCurrentID) of the area P (place) illustrated in FIG. 14 on which an operation is performed just before previous termination. The placeMap.xml describes a plurality of layer settings 201 that consists of <layer name="X", tag="Y"> and </layer>. In this case, "X" and "Y" mean null or an arbitrary character string.

When the place map screen illustrated in FIG. 14 is displayed by a predetermined displaying unit, a display control unit, which controls the predetermined displaying unit, sequentially draws layers (areas L) corresponding to the layer settings 201 from the upper side of the screen in accordance with the order of the layer settings 201 described (stored) in the place map information (placeMap.xml). In other words, the order of the layer settings 201 described in the place map information is directly associated with the drawing position (display position) of layers.

When a layer name is registered in the layer setting 201, in other words, when an arbitrary character string is registered in "X" of "layer name="X"", the character string is drawn in the layer name area L1 provided on the layer illustrated in FIG. 14. For example, in the second layer setting 201 illustrated in FIG. 4, "favorite" is registered in the layer name. In this case, "favorite" is drawn in the layer name area L1 provided on the second layer corresponding to the layer setting 201 as illustrated in FIG. 14. When "X" is null, in other words, when the layer name is not registered, a character string (for example, "not set" illustrated in FIG. 14) meaning the absence of registration may be displayed in the area, or null (not display) may be displayed in the area. Conversely, a null layer cannot be displayed. Nevertheless, when a layer name is registered, it is preferable to display the layer name in the layer name area L1.

As illustrated in FIG. 4, a plurality of place settings 202 that is a tag expressed with <place ID="Z"> is described in each layer setting 201. In this case, "Z" means null or an arbitrary character string. The place setting 202 corresponds to the area P (place) illustrated in FIG. 14. The place is displayed in association with the layer of the layer setting 201 including the place setting 202. When the place map screen illustrated in FIG. 14 is displayed, place images (placeicon.jpg: see FIG. 3) that are symbol images corresponding to the place settings 202 are sequentially drawn from the left to the right of the layer in accordance with the order of the place settings 202 described in the layer setting 201. In other words, the order of the place settings 202 described in the layer setting 201 indicates position information for drawing the place images on the place map screen in the shape of a matrix.

In this case, when the name of place is registered in the place setting 202, in other words, when an arbitrary character string is registered in "Z" of "placeID="Z"", a display control unit 512 draws the character string on the corresponding place. For example, in the second (the second from the top) layer setting 201 illustrated in FIG. 4, "My Place" is registered in the place name of the second place setting 202 from the top. In this case, on the place map screen, "My Place" is displayed in the middle place of the second layer corresponding to the layer setting 201 and the place setting 202 as illustrated in FIG. 14.

When "Z" is null, in other words, when the name of place is not registered, a character string (for example, "New Place!" as illustrated in FIG. 14) meaning the absence of registration can be displayed, or null (not display) can be displayed. As described below, when an icon image (placeicon.jpg: see FIG. 3) is registered in association with the place setting 202, the icon image is drawn on the corresponding place.

In the layer setting 201, a layer attribute, which is an index for characterizing each layer (the layer setting 201) input from the client terminal 500 illustrated in FIG. 1, is registered in "tag="Y"". The layer attribute can have, for example, an arbitrary character string such as "favorite" and "photograph" like the second layer setting 201 illustrated in FIG. 4. The attribute of layer registered in the layer is handed over to places displayed on the layer by inheritance. Therefore, the attribute of layer functions as a large item common to the places.

An initial state of the place map information (placeMap.xml) describes the plurality of layer settings 201 (for example, three) in which the layer name and the layer attribute are not registered. Moreover, each of the layer settings 201 describes the plurality of place settings 202 (for example, three) in which the place name and the place attribute are not registered. The number of place settings is the same for each of the layer settings.

Returning to FIG. 3, the place management part 310 illustrated in FIG. 3 contains various configuration information related to each place described above. In other words, a Placeconf folder of the place management part 310 is a root folder of the place management part 310. The Placeconf folder has at the lower order thereof placeID folders (placeID, placeID2, . . . ) corresponding to the file management information and DEF_PLACE folders that store configuration information related to place before the attribute or name of place is not registered.

The placeID folders respectively correspond to the place settings 202 (FIG. 4) described in the place map information (placeMap.xml) of the map management part 210. Each of the place settings 202 can refer to the corresponding placeID folder. Specifically, when the name of place is registered, a folder having the same folder name as the place name is generated as a placeID folder. Each of the place settings 202 is associated with the placeID folder. In addition, the place setting 202 in which the name of place is not registered refers to the DEF_PLACE folder.

The lower folders of the placeID folder store file registration information of the place (hereinafter, "corresponding place") corresponding to the placeID folder.

Information related to the place corresponding to the placeID folder that stores the place.xml folder is registered in the place.xml (place information) folder. For example, the information is the place attribute or comment that is an index for characterizing each place input from the user (the client terminal 500). An arbitrary character string such as a word or a symbol can be registered in the place attribute.

The place attribute can be registered independently of the layer attribute described above. The attribute of layer functions as a large item common to places. Conversely, the attribute of place functions as a small item for each place. In other words, in the place map screen illustrated in FIG. 14, files can be systematically managed by using large and small items based on layer and place (area P).

The placeicon.jpg is an icon image (symbol image) that is drawn on the place corresponding to each placeID folder in which the placeicon.jpg is stored, in the place map screen illustrated in FIG. 14. The format of an image stored as an icon image is not limited to this. Meanwhile, when an icon image is not registered by the user, the file management system 100 can display default image data prepared previously.

An YYYYMM folder is a folder that indicates year and month on which a file is registered in the corresponding place. The YYYYMM folder is generated every year and month on which a file is registered by a setting modifying unit 413 illustrated in FIG. 5 to be described below. In this case, "YYYY" indicates a year (the Christian era) and "MM" indicates a month. The YYYYMM folder includes, as a lower folder, a DD folder that indicates the day on which a file is registered in the corresponding place. The DD folder is generated every day on which a file is registered by the setting modifying unit 413. In other words, the date on which a file is registered in the place can be confirmed by using the data in the YYYYMM folder and the DD folder.

The DD folder includes, as a lower folder, a contentsID folder that corresponds to each file registered in the place. In this case, the folder name of the contentsID folder has the file name (except the extension) of the file registered in the place. The creation of name is not limited to this. For example, file names can sequentially have numeric values consisting of consecutive numbers.

The contentsID folder includes, as lower data, a content.xml in which information related to the file corresponding to the contentsID folder is described, thumbnail.jpg that is the thumbnail image of the file, original.jpg that is the original data of the file, and so on. In this case, the content.xml (file information) includes a storage position at which the file corresponding to the contentsID folder is actually stored and file-related information such as a file attribute (to be described below) registered in the file. The original data of the file can have original.png if the file is image data or original.doc if the file is document data, other than the original.jpg.

The DEF_PLACE folder has a configuration similar to that of the placeID folder described above and stores configuration information related to an unregistered place. In this case, place information is information determined in the initial state that does not have an attribute, and an YYYYMM folder and lower folders thereof are not present.

Moreover, in the place management part 310, each placeID folder includes member.xml (member list) that records user IDs of users that are an owner and a joint owner of the placeID folder (in other words, place). When the member list has a plurality of user IDs, the place is shared between the users of the user IDs recorded in the member list. Hereinafter, a place in a shared state is referred to as a shared place.

Among the user IDs recorded in the member list, the user ID of the user, who creates the place corresponding to the placeID folder that stores the member list, has identification information identifying that the user is an owner of the place. Moreover, the user ID of a user that is a joint owner of the place has access permission to be described below.

As described above, the storage unit 46 manages data for use in the display of a place map for every user in the map management part 210, for example, the layer setting 201 and the place setting 202 and manages data of place when each place map is displayed in the place management part 310, for example, file data registered in the place. Therefore, the place map illustrated in FIG. 14 can be displayed by using the data stored in the storage unit 46.

Figure 5:
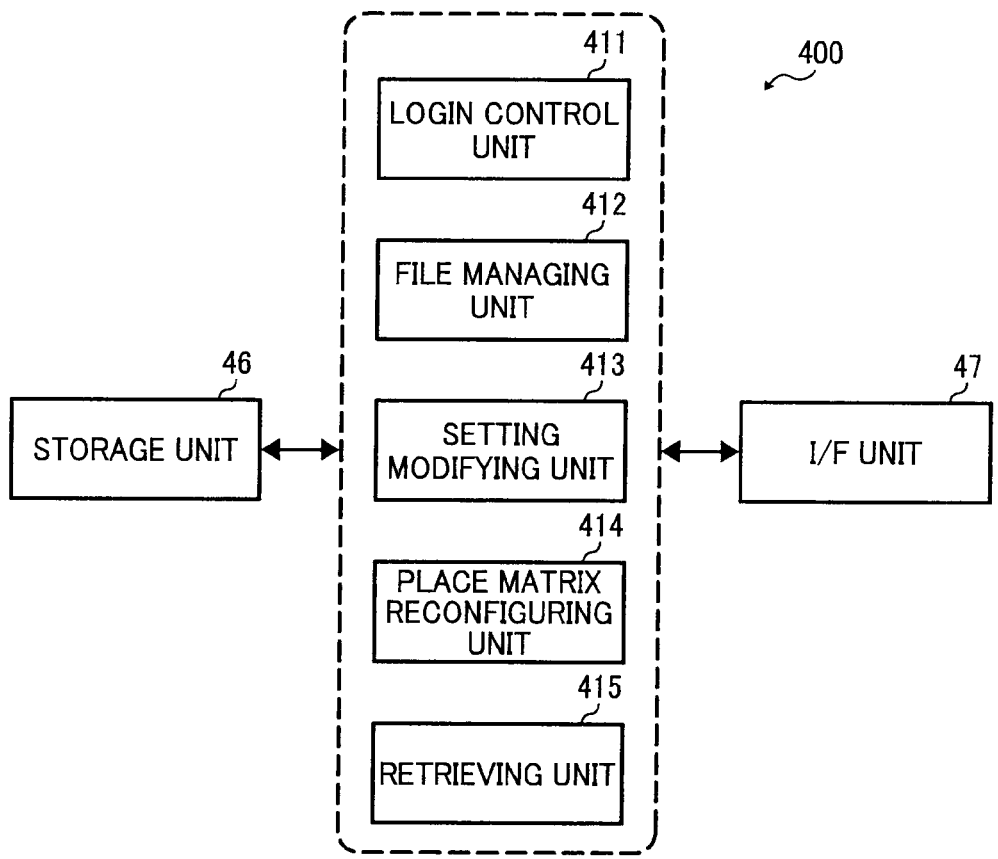
FIG. 5 is a functional block diagram of the file management server shown in FIG. 2.

FIG. 5 is a functional block diagram of the file management server 400. The file management server 400 includes a login control unit 411, a file managing unit 412, the setting modifying unit 413, a place matrix reconfiguring unit 414, and a retrieving unit 415. The login control unit 411 is an authentication unit that authenticates a login request received from the client terminal 500 (user) illustrated in FIG. 1. The file managing unit 412 manages files for every user in the storage unit 46 illustrated in FIG. 2. The setting modifying unit 413 is a generating unit that changes configuration information stored previously in the storage unit 46 in response to an instruction received from the client terminal 500 through the I/F unit 47. The place matrix reconfiguring unit 414 reconfigures a place matrix based on setting modification when the setting modifying unit 413 modifies the setting of the place matrix, in other words, modifies the contents of the place.xml illustrated in FIG. 4. The retrieving unit 415 retrieves a file stored in the storage unit 46 in response to the instruction received from the client terminal 500 through the I/F unit 47. These units are realized by virtue of the cooperation of the CPU 41 and various types of computer programs stored in the ROM 42 or the storage unit 46.

Next, each unit of the file management server 400 illustrated in FIG. 5 will be explained in detail. The login control unit 411 receives a login request to be described below from the client terminal 500 and compares a set of a user ID and a password included in the login request by collating data previously stored in the storage unit 46 to authenticate whether the user is a registered user. The collating data includes a set of the user ID and a password of every user registered previously as a registered user.

The file managing unit 412 reads the configuration information illustrated in FIG. 3 and files, which are used for displaying a user interface on a display unit 55 of the client terminal 500, from the storage unit 46 for the user determined as a registered user by the login control unit 411. Then, the file managing unit 412 sends the information and files to the client terminal 500 from which the login request was received.

Moreover, for the user ID whose login is permitted by the login control unit 411, the file managing unit 412 reads the place map information (placeMap.xml) of the map management part 210 (FIG. 3) corresponding to the user ID and the placeID folder of the place management part 310 from the storage unit 46, and sends the information and folder to the client terminal 500. Specifically, when a user folder ("user1", "user2", and so on: FIG. 3) corresponding to the user ID whose login is permitted is identified, the file managing unit 412 reads the place map information (placeMap.xml) from the map management part 210 of the user folder. Also, the file managing unit 412 reads, from the place management part 310, the placeID folder that corresponds to the placeID (FIG. 4) described in the place map information and of which the member list (member.xml: FIG. 3) has the user ID.

When the user folder corresponding to the user ID whose login is permitted is not present in the map management part 210, in other words, when the user logs in with a new user ID, the file managing unit 412 generates a user folder having the new user ID name in the map management part 210 and newly generates the map management part 210 and the place management part 310 at the lower side of the user folder. It is assumed that the place map information of the newly-generated map management part 210 means that places are not set, for example, a 3*3 place matrix is set as an initial state.

Furthermore, when the configuration information is updated by the setting modifying unit 413 and the place matrix reconfiguring unit 414, the file managing unit 412 sends the updated configuration information to the client terminal 500 to update configuration information held in the client terminal 500. In this case, the configuration information to be sent can be difference data indicative of only a part that has been modified, or can be all configuration information related to the user ID in login.

When the file managing unit 412 receives a reading request for requesting the reading of files in a specific place from the client terminal 500 as described below, the file managing unit 412 reads the thumbnail images (thumnail.jpg: FIG. 3) of the files from the storage unit 46 and sends the thumbnail images to the client terminal 500 from which the reading request was received.

When the setting modifying unit 413 receives, from the client terminal 500, a request for requesting setting modification related to the place map screen such as registration (upload) or deletion of a file, setting modification of layer name or place name, or movement or deletion of place, the setting modifying unit 413 updates configuration information of the storage unit 46 in accordance with the request contents.

The place matrix reconfiguring unit 414 modifies the number of layers and the number of places constituting the place matrix on the place map screen and reconfigures the place matrix, in accordance with the setting contents of the place map information modified by the setting modifying unit 413.

When the retrieving unit 415 receives, from the client terminal 500, a retrieval request that uses attribute information (tag) assigned to each layer, place, and file or a specific character string (hereinafter, "a keyword") as a retrieval key, the retrieving unit 415 retrieves a file corresponding to the retrieval key from the storage unit 46.

When the file corresponding to the retrieval key is retrieved from the storage unit 46, the retrieving unit 415 identifies the contentsID folder corresponding to the retrieved file from the place management part 310 illustrated in FIG. 5 and copies various types of data below the contentsID folder and the tree structure of the DD folder and the YYYYMM folder that include the contentsID folder in another storage area of the RAM 43 or the storage unit 46 illustrated in FIG. 2.

Next, the retrieving unit 415 merges the copied contentsID folder with the date represented by the YYYYMM folder and the DD folder, generates the placeID folder consisting of the retrieved files, and sends the placeID folder to the client terminal 500 as the retrieval result for the retrieval request. In this case, it is assumed that the place information (place.xml) of the placeID folder describes each contentsID folder name and the contents of the place information of the placeID folder, which stores the original (the contentsID folder of the copy source) of the contentsID folder, in association with each other.

Figure 6:
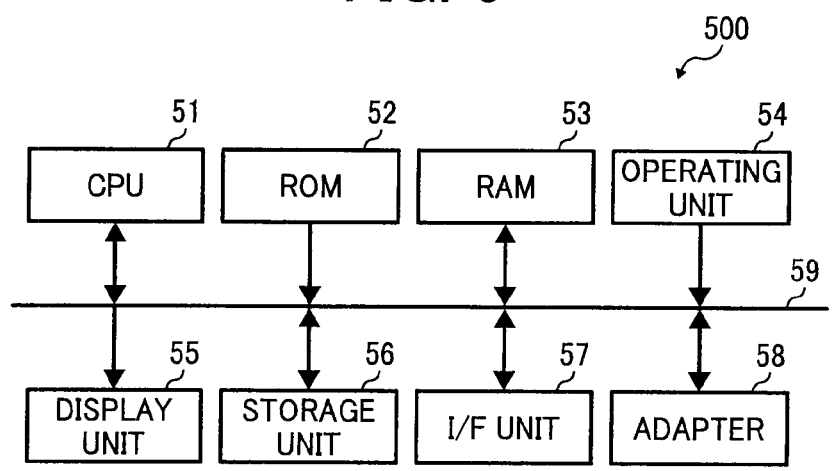
FIG. 6 is a diagram illustrating the hardware configuration of an arbitrary one of client terminals shown in FIG. 1.

Next, it will be explained about the hardware configuration of the client terminal 500 illustrated in FIG. 1. FIG. 6 is a diagram illustrating the hardware configuration of the client terminal 500. The client terminal 500 includes a CPU 51, a ROM 52, a RAM 53, an operating unit 54, the display unit 55, a storage unit 56, an I/F unit 57, an adapter 58, and a bus 59. The CPU 51 executes a computer program to control the whole of the apparatus and realizes each function unit (see FIG. 7) to be described below. The ROM 52 stores therein a computer program and various types of data. The RAM 53 stores therein a computer program read by the CPU 51. The operating unit 54 includes input devices such as a mouse and/or a keyboard. The display unit 55 includes a display device such as a liquid crystal monitor. The storage unit 56 is a storage device such as HDD (Hard Disc Drive) and stores therein various types of computer programs and data. The I/F unit 57 controls communication with a not-shown external apparatus. An auxiliary memory, such as a memory card, can be removably coupled to the adapter 58. The bus 59 interconnects these units.

Figure 7:
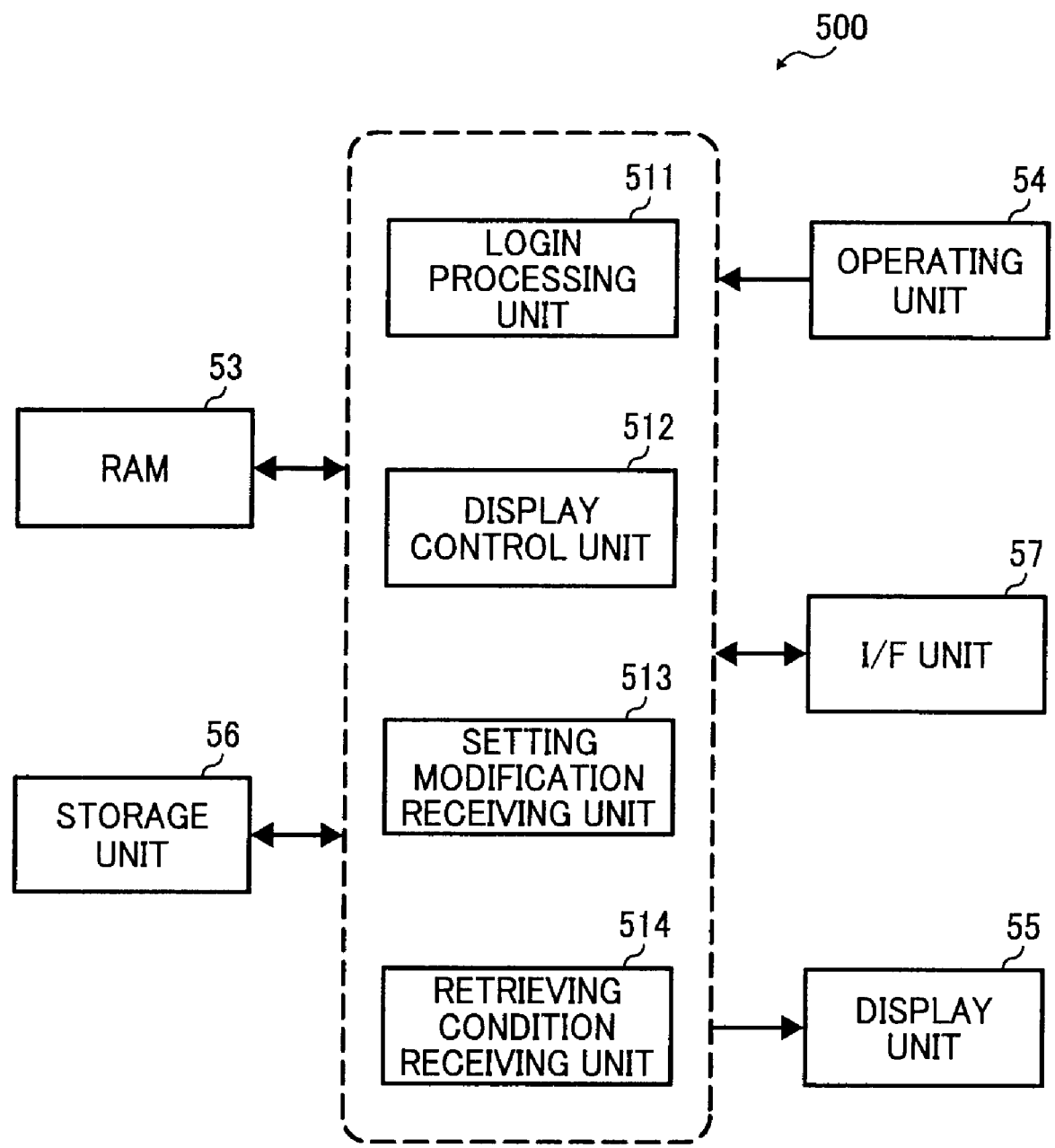
FIG. 7 is a functional block diagram of the client terminal shown in FIG. 6.

FIG. 7 is a functional block diagram of the client terminal 500. The client terminal 500 includes a login processing unit 511, the display control unit 512, a setting modification receiving unit 513, and a retrieving condition receiving unit 514. The login processing unit 511 performs a login process with respect to the file management server 400. The display control unit 512 displays thumbnail images for a file in a list pattern based on various types of data received from the file management server 400. The setting modification receiving unit 513 is a sending/receiving unit that receives setting modification (generation request of placeID) for the place map screen requested from the user and sends the received setting modification to the file management server 400. The retrieving condition receiving unit 514 receives a retrieval key or the like input from the operating unit 54.

The login processing unit 511 displays a login screen for the user for logging in to the file management server 400 on the display unit 55. When the user inputs a user ID and a password from the login screen, the login processing unit 511 sends a login request including the information to the file management server 400.

The display control unit 512 displays thumbnail images for the file belonging to the corresponding place in a list pattern on the display unit 55, based on various types of data (the placeID folder etc. illustrated in FIG. 3) received from the file management server 400 via the I/F unit 57. Specifically, when the display control unit 512 receives configuration information sent from the file management server 400 at the time of login or setting modification, the display control unit 512 saves the configuration information in the RAM 53 or the storage unit 56 in a tree structure illustrated in FIG. 3. Moreover, when the display control unit 512 receives an operation related to a screen display from the user via the operating unit 54, the display control unit 512 displays thumbnail images for the file on the display unit 55 based on the configuration information saved in the RAM 53 or the storage unit 56. In other words, the display control unit 512 cannot handle the place map information (placeMap.xml) and cannot display the place map, among various types of data received from the file management server 400.

The setting modification receiving unit 513 receives an operation related to setting modification for the placeID (place information) illustrated in FIG. 3 and sends a setting modification request according to the modification to the file management server 400, in order to request the setting modification to the file management server 400. In this case, an operation related to setting modification for the place map screen means the registration, modification, or deletion of the place name. Therefore, the setting modification receiving unit 513 cannot receive an operation for modifying a positional relationship on a matrix, such as the movement of place on the place map screen or the registration of the name of place after designating the position of the place. When receiving these operations via the operating unit 54, the setting modification receiving unit 513 sends information, which includes at least the contents of operation and the user ID of the user in login, to the file management server 400 as a modification request.

The retrieving condition receiving unit 514 receives attribute information (tag) assigned to each layer, place, and file or a specific character string (keyword) as a retrieval key and sends a retrieval request, which includes at least these retrieving conditions and the user ID of the user in login, to the file management server 400, in order to request the retrieval of file to the file management server 400.

Hereinafter, it will be explained about a file management process performed by the file management server 400 and the client terminal 500 that constitutes the file management system 100.

First, a process for requesting setting modification of place from the client terminal 500 to the file management server 400 will be explained. The client terminal 500 does not include dedicated software for displaying the place map screen illustrated in FIG. 14. Therefore, to create a new place, the client terminal 500 communicates with the file management server 400 by using a general browser and uploads data including the place name and tag of the new place, the description of place, and so on.

Figure 8:
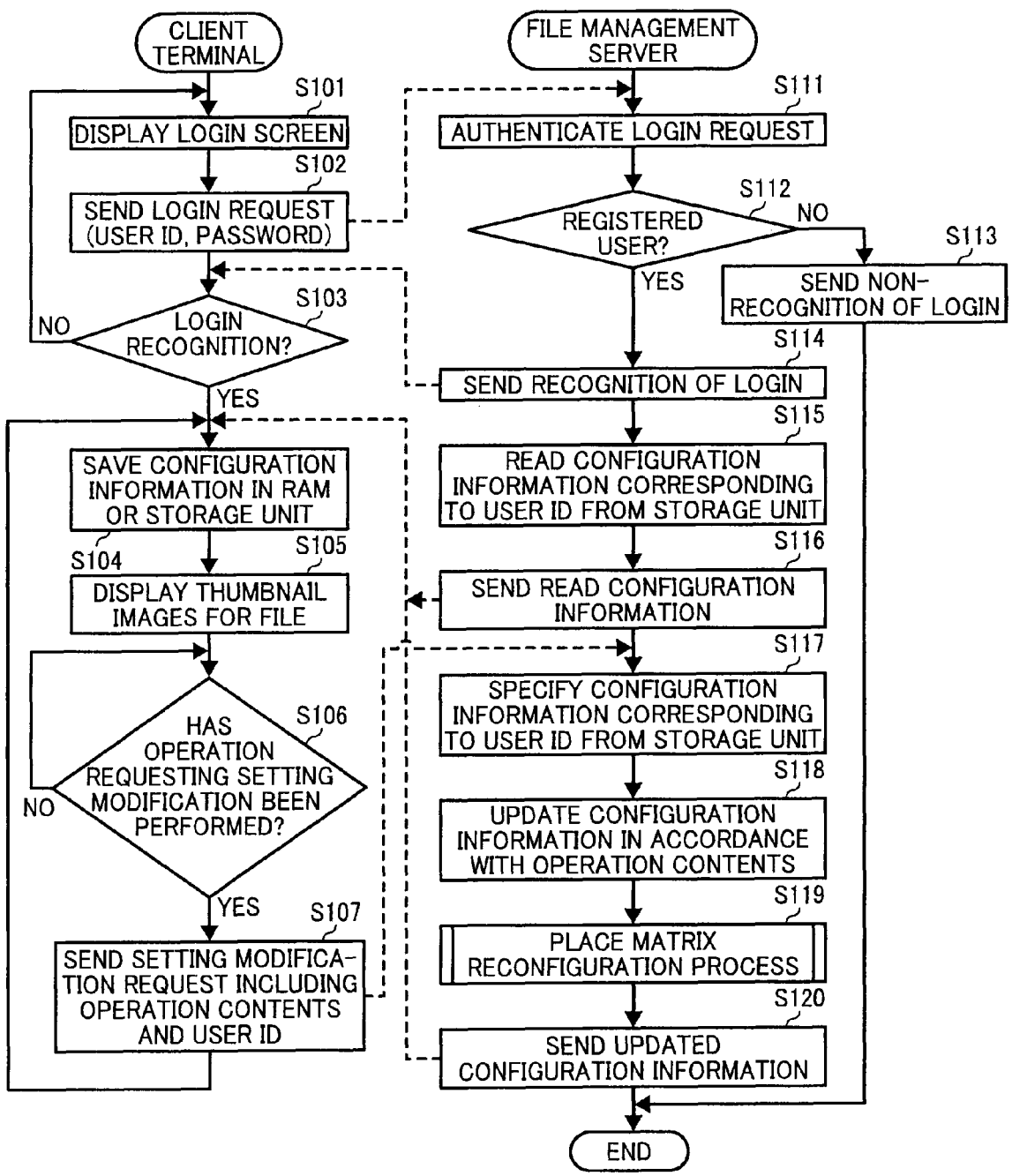
FIG. 8 is a flowchart illustrating a place setting modification process performed between the file management server and the client terminal.

FIG. 8 is a flowchart of a place setting modification process performed by the file management server 400 and the client terminal 500. As a precondition to the present process, it is assumed that the user ID and password of the user that operates the client terminal 500 are already registered in the file management server 400.

First, the display control unit 512 of the client terminal 500 downloads a login screen from the file management server 400 via the network 200 illustrated in FIG. 1 and causes the display unit 55 to display the login screen (Step S101). When the user inputs the user ID and password onto the login screen, the login processing unit 511 sends a login request, which includes at least the user ID and password input by the user, to the file management server 400 (Step S102).

On the other hand, upon receiving the login request from the client terminal 500, the login control unit 411 of the file management server 400 illustrated in FIG. 5 compares a set of the user ID and password included in the login request with the collating data previously stored in the storage unit 46 to authenticate whether the user is a registered user (Step S111).

By virtue of the authentication performed at Step S111, when it is determined that the set of the user ID and password are not identical with the collating data, in other words, when it is determined that the user is not a registered user (No at Step S112), the login control unit 411 sends response information indicative of non-recognition of login to the client terminal 500 from which the login request was received (Step S113), and the process terminates.

Conversely, at Step S112, when it is determined that the set of the user ID and password included in the login request is identical with the collating data, in other words, when it is determined that the user is a registered user (Yes at Step S112), the login control unit 411 sends response information indicative of recognition of login to the client terminal 500 from which the login request was received (Step S114) and the process control proceeds to Step S115.

In the client terminal 500, the login processing unit 511 receives the response information from the file management server 400 and determines whether the response information indicates the recognition of login (Step S103). When the received response information is non-recognition response information (No at Step S103), the process control returns to Step S101, that is, the display unit 55 again displays the login screen. At this time, the display control unit 512 can cause the display unit 55 to display information that the user ID or the password has an error. On the other hand, at Step S103, when the received response information is recognized response information (Yes at Step S103), the process control proceeds to Step S104.

Meanwhile, in the file management server 400, when the login control unit 411 (FIG. 5) determines that the user is a registered user, the file managing unit 412 reads configuration information (file management information such as placeID) corresponding to the user ID included in the login request from the storage unit 46 (Step S115), and sends the configuration information to the client terminal 500 from which the login request was received (Step S116).

In the client terminal 500, when the display control unit 512 receives the configuration information sent from the file management server 400, the display control unit 512 saves the configuration information in the RAM 53, or in the storage unit 56, in a tree structure illustrated in FIG. 3 (Step S104). Next, the display control unit 512 displays thumbnail images for the file included in the received configuration information on the display unit 55 in a list pattern based on the configuration information held at Step S104 (Step S105).

When thumbnail images for the file are displayed on the display unit 55 in a list pattern, the setting modification receiving unit 513 monitors whether the user performs an operation for requesting the modification of the setting contents (Step S106). When it is determined that such an operation is performed (Yes at Step S106), in other words, when it is determined that registration, modification, or deletion of the place name is performed in the client terminal 500, the setting modification receiving unit 513 sends a setting modification request, which includes at least information indicative of the operation contents and the user ID of the user in login, to the file management server 400 (Step S107).

Meanwhile, in the file management server 400, when the setting modifying unit 413 receives the setting modification request from the client terminal 500, the setting modifying unit 413 identifies configuration information corresponding to the user ID included in the setting modification request from the storage unit 46 (Step S117). Next, the setting modifying unit 413 updates the configuration information identifies at Step S117 in accordance with the operation contents included in the setting modification request (Step S118). Then, the setting modifying unit 413 performs a place matrix reconfiguration process, which is described in detail below, on the place map information of the user ID (Step S119).

The file managing unit 412 reads the configuration information updated at Step S118 from the storage unit 46 and sends the configuration information to the client terminal 500 from which the setting modification request was received (Step S120), and the process is terminated.

When an icon image for place is included in the setting modification request sent at Step S107, the icon image data (placeicon.jpg: FIG. 3) is stored at a predetermined position in the placeID folder. Moreover, the type (PC, MFP, digital camera, etc.) of request-source terminal is determined from the identification information such as the user ID sent along with the setting modification request. Based on the decision result, the corresponding icon image can be selected from the icon images that are previously registered in the storage unit 46 of the file management server 400 in association with the type of terminal and can be stored at the predetermined position in the placeID folder.

Figure 15:
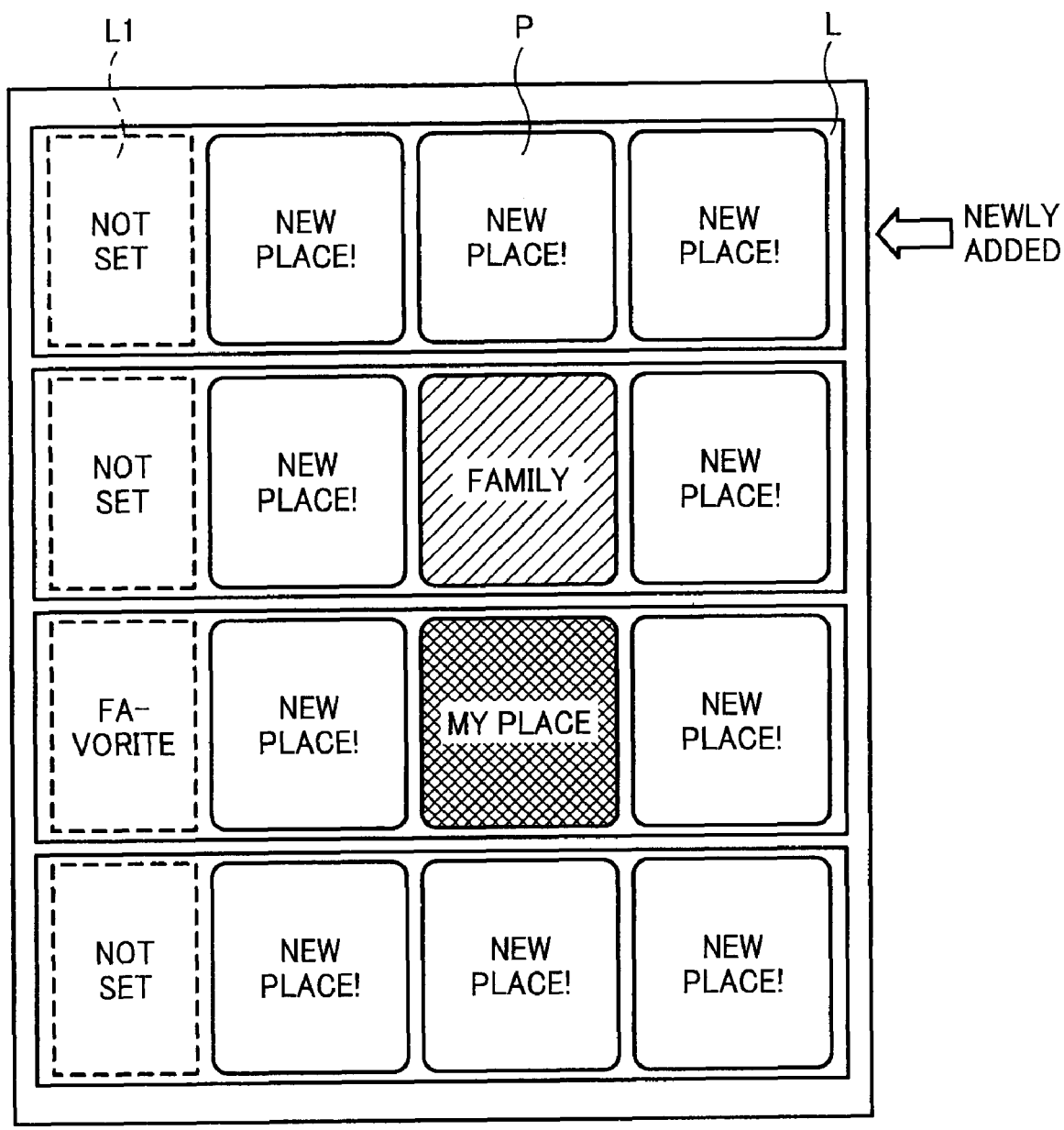
FIG. 15 is a diagram illustrating a place matrix reconfigured when the attribute of place and the name of place are registered in an area P belonging to the most significant layer of the place matrix before reconfiguration.
Figure 16:
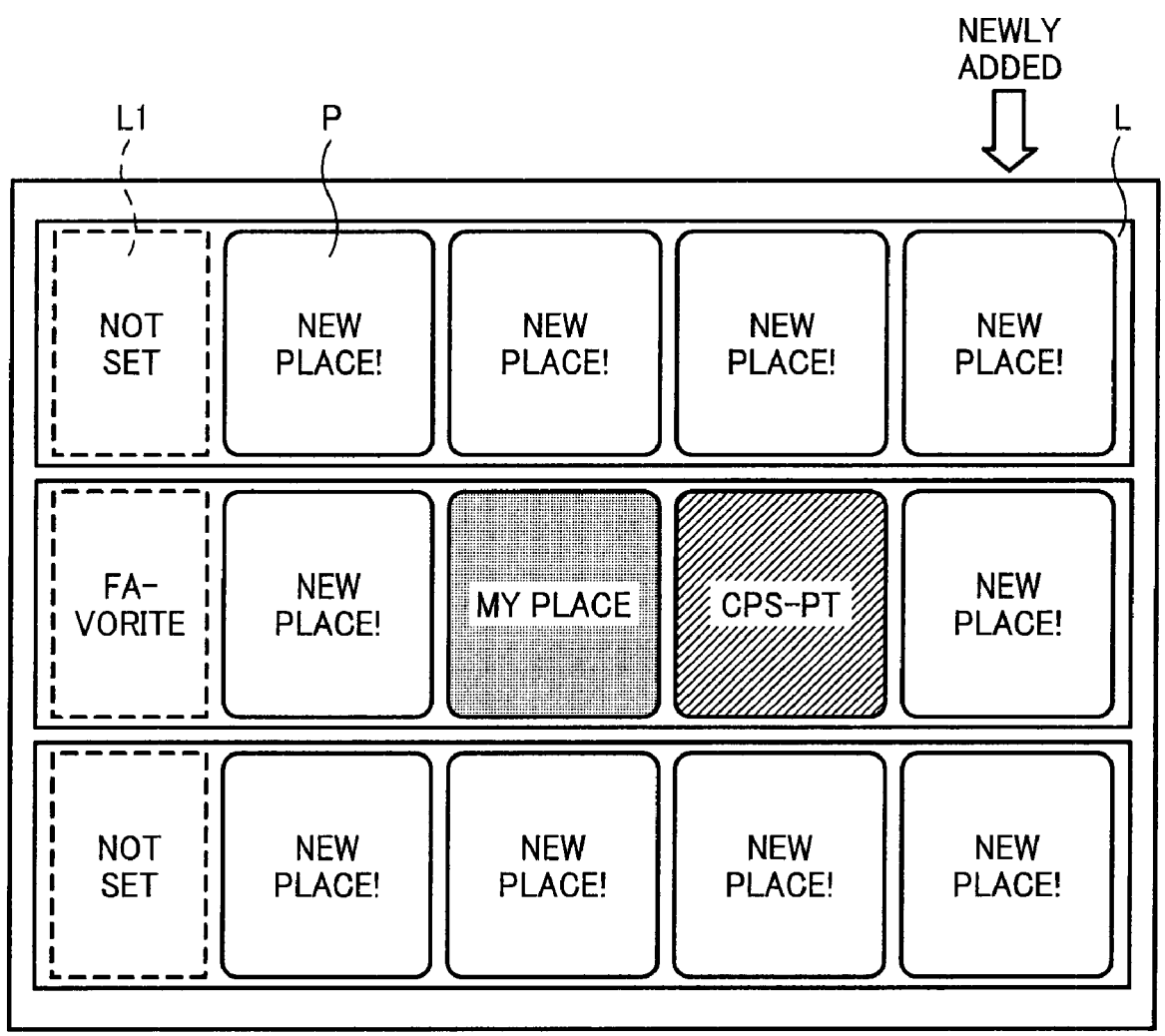
FIG. 16 is a diagram illustrating a place matrix reconfigured when the attribute of place and the name of place are registered in an area P belonging to the rightmost column of the place matrix before reconfiguration.
Figure 17:
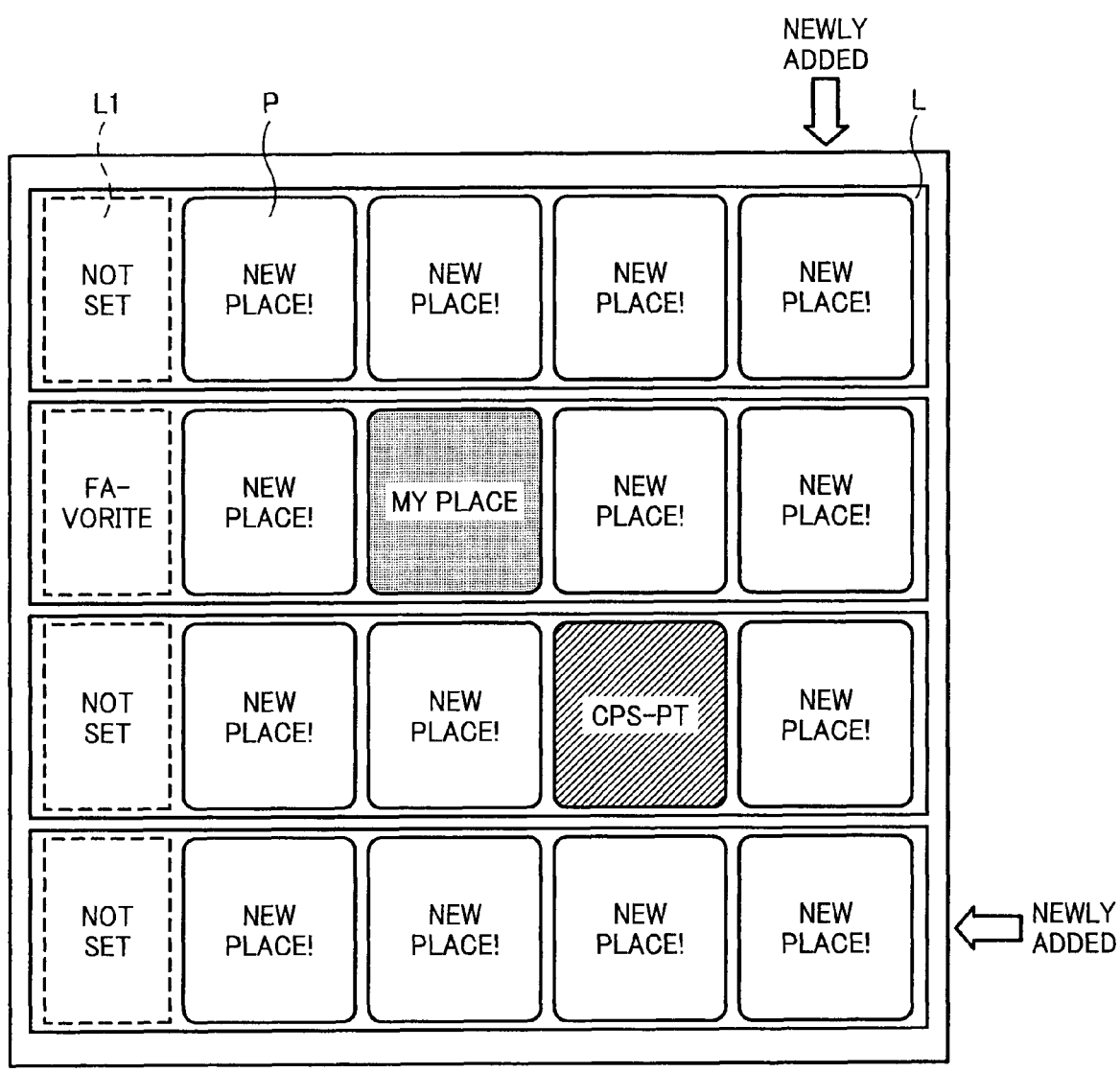
FIG. 17 is a diagram illustrating a place matrix reconfigured when the attribute of place and the name of place are registered in an area P belonging to the least significant layer and the rightmost column of the place matrix before reconfiguration.

For example, at Step S106, when modification or deletion of the place name of the predetermined place is performed, the setting modifying unit 413 performs modification or deletion (modification to null) of the name of placeID illustrated in FIG. 4. On the other hand, at Step S106, to prevent addition of the place row or the place column as illustrated in FIGS. 15 to 17 when registration (registration of a new place) of the place name of the predetermined place is performed, the setting modifying unit 413 registers the place name in placeID, of which the place name is non-registration, close to the center of the place matrix among placeID illustrated in FIG. 4.

Figure 9:
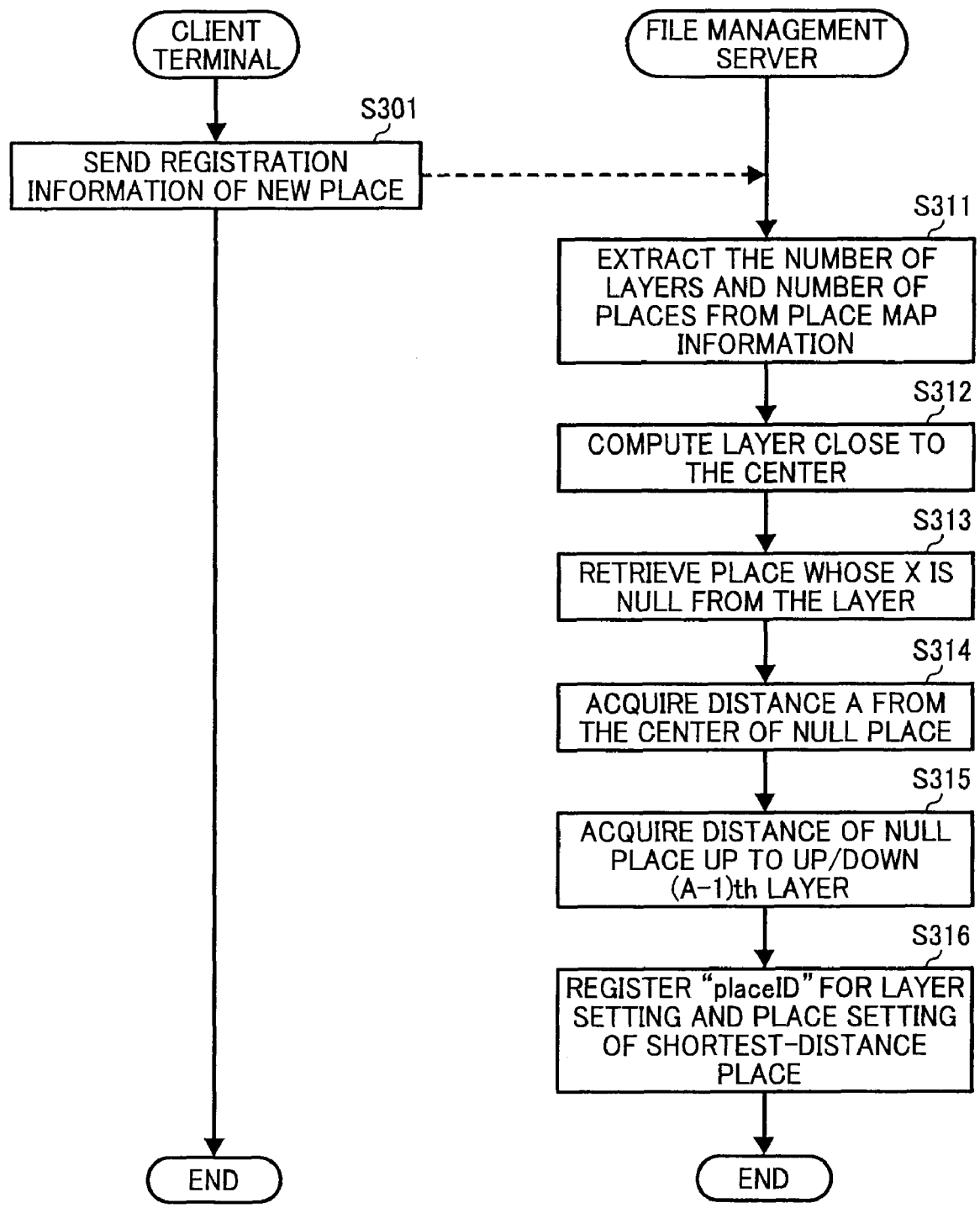
FIG. 9 is a flowchart of a configuration information updating process performed when registering a new place.
Figure 10:
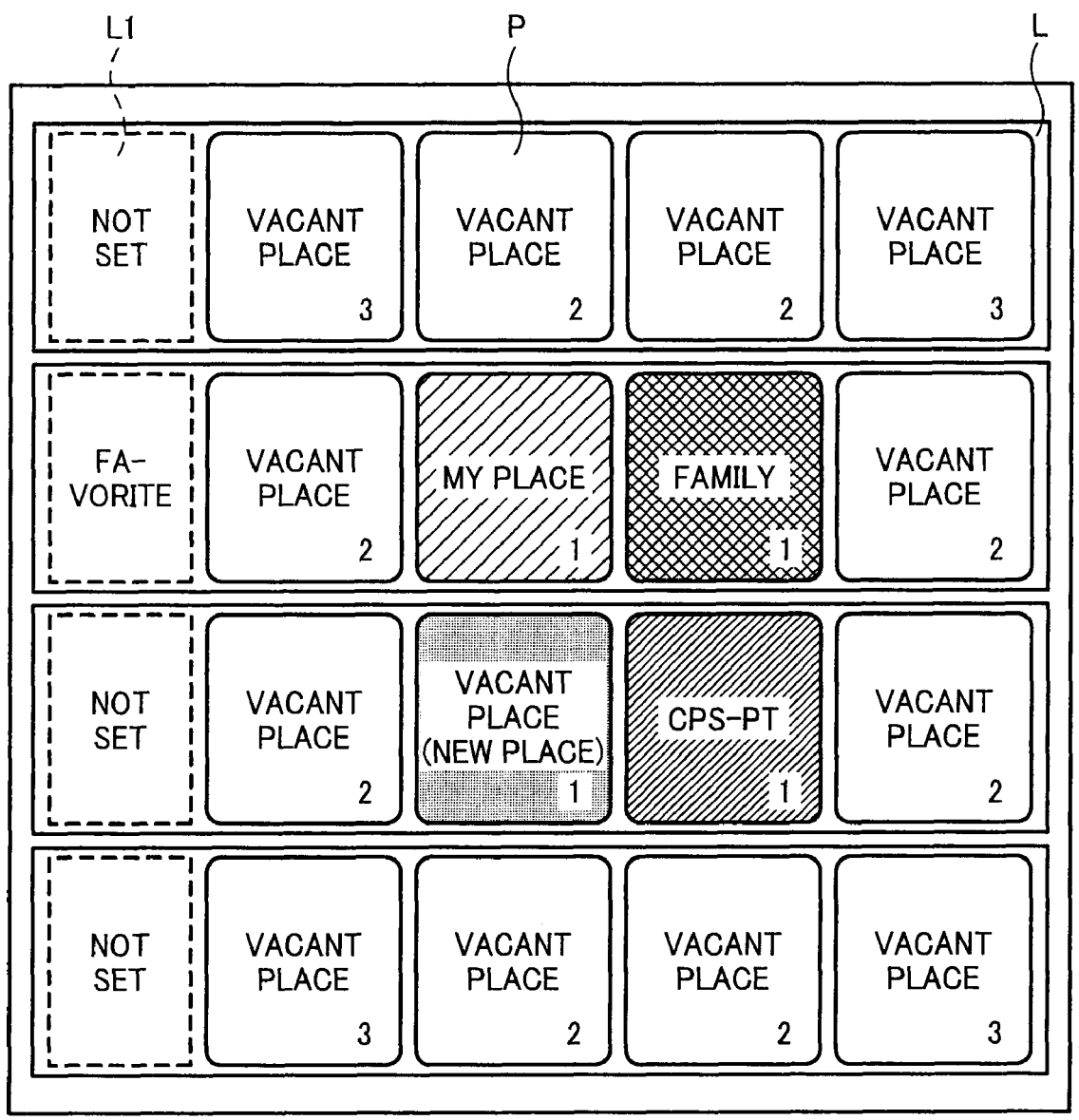
FIG. 10 is a diagram illustrating a specific example of registering a new place.

How the new place is registered will be explained now with reference to FIGS. 9 and 10. FIG. 9 is a flowchart of a configuration information updating process when the new place registration process is performed at Step S118 illustrated in FIG. 8. FIG. 10 is a diagram illustrating a specific example of registering the new place in accordance with the process flow illustrated in FIG. 9. First, when a registration operation for a new place is performed at Step S106 illustrated in FIG. 8, the setting modification receiving unit 513 of the client terminal 500 sends the user ID of the user in login and registration information for the new place, that is, the place name and tag of the new place and the description of place (Step S301).

In the file management server 400, when the setting modifying unit 413 receives the user ID and the registration information for the new place from the client terminal 500 via the network 200 illustrated in FIG. 1, the setting modifying unit 413 retrieves the place map information (placeMap.xml) of the map management part 210 illustrated in FIG. 3 based on the received user ID and extracts the number of layers and the number of places from the place map information (Step S311). In the example illustrated in FIG. 10, the setting modifying unit 413 extracts four as the number of layers and four as the number of places.

Next, the setting modifying unit 413 computes a layer (the layer setting 201: FIG. 4) close to the center of the place map information from the number of extracted layers (Step S312). For example, if the number of extracted layers is five (odd number), the layer close to the center is the third layer (center) from the top. If the number of extracted layers is four (even number), the layer close to the center is the second and third layers from the top. Therefore, in the example illustrated in FIG. 10, the layer close to the center is the second and third layers from the top.

Next, the setting modifying unit 413 retrieves a place for which "X" of placeID is null, that is to say, a place whose name is not registered (the place setting 202: FIG. 4) in the computed layer (Step S313).

Moreover, the setting modifying unit 413 is a computing unit. Therefore, the setting modifying unit 413 computes a distance, distant from the center, of the place retrieved at Step S313 (Step S314), and acquires the shortest distance as a distance A among the distances for the places. The distance A is a distance distant from the central place in the place matrix. In this case, a unit of distance is the number of places. In other words, when the number of places of the layer is an odd number, the distance A of the place located at the center is one and the distance A of the place located in the neighbor thereof is two. When the number of places is an even number, the distance A of the two places located at the center is one and the distance A of the place located in the neighbor thereof is two. In the example illustrated in FIG. 10, numeric values written in places indicate distances from the central places of which the distance A is one. A method for computing a distance is not limited to this. The computation method can be a method for comparing distances of places distant from the center of the matrix based on a certain standard.

Next, the setting modifying unit 413 holds the distance A acquired at Step S314 and computes a distance, distant from the center, of a place for which "X" of placeID is null in the layers from the central layer to the (A−1)th layers up and down (Step S315). In this case, as illustrated in FIG. 10, the distance of the place located on each layer increases one by one whenever the layer is distant from the central layer one by one.

The setting modifying unit 413 registers the registration information for the new place received from the client terminal 500 at Step S301 in the place setting 202 (FIG. 4) for the place having the shortest distance among the distances acquired at Steps S314 and S315 (Step S316). In this way, there is generated the placeID folder (FIG. 3) that is associated with the place setting 202 (FIG. 4) in which the new place is registered, in other words, that corresponds to the place setting 202. In the example illustrated in FIG. 10, a place having the shortest distance is the second place from the leftmost end in the third layer from the top, of which the distance is one. The registration information for the new place is registered in "X" of placeID (FIG. 4) corresponding to the place.

When registration for a new place is performed in the place setting modification process illustrated in FIG. 8, the new place is registered in a vacant place so that the place matrix is not expanded as illustrated in FIGS. 9 and 10. However, when such a vacant place is not present, the new place is registered in a vacant place in the end of the place matrix. This leads to reconfigure the place matrix for expansion.

Figure 11:
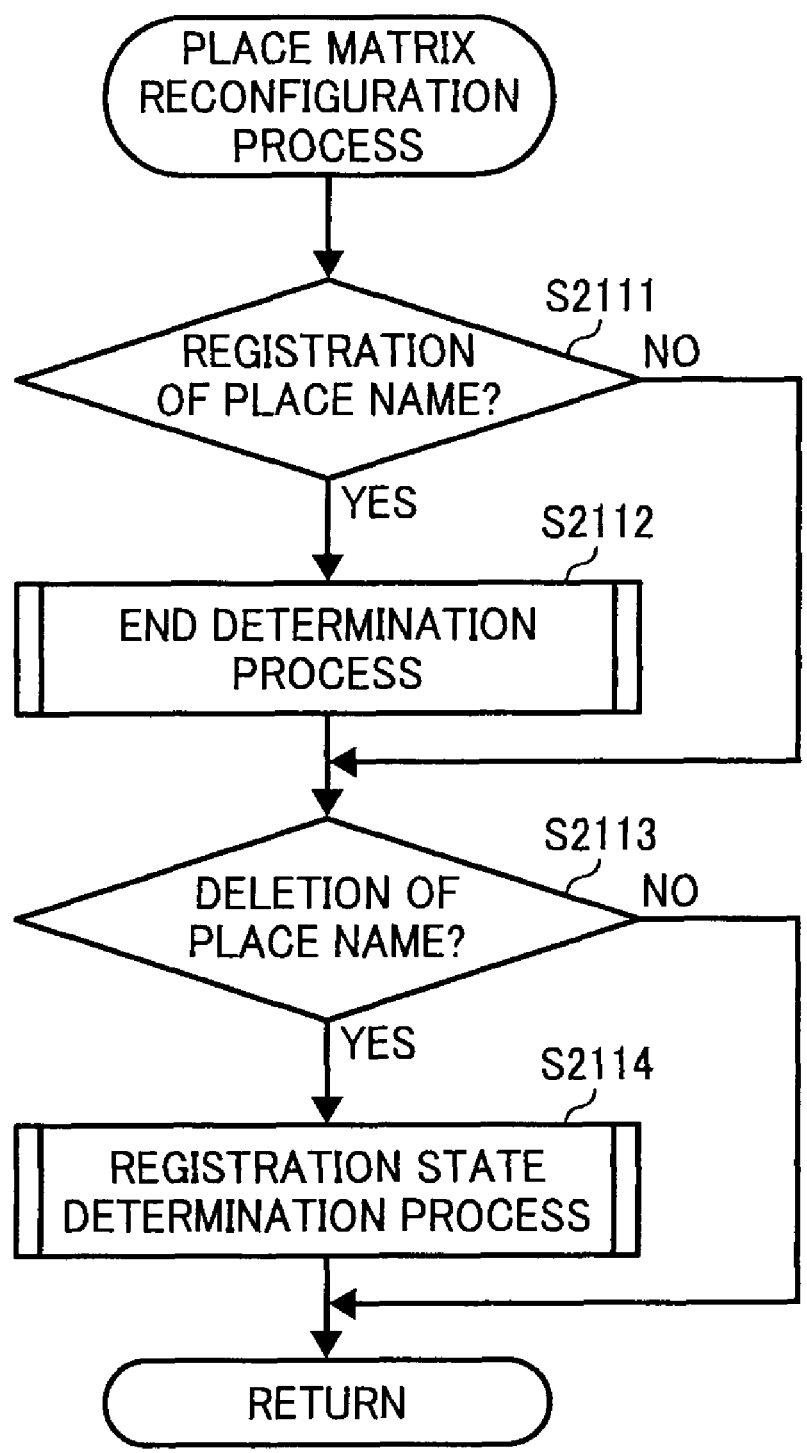
FIG. 11 is a flowchart of a place matrix reconfiguration process.
Figure 12:
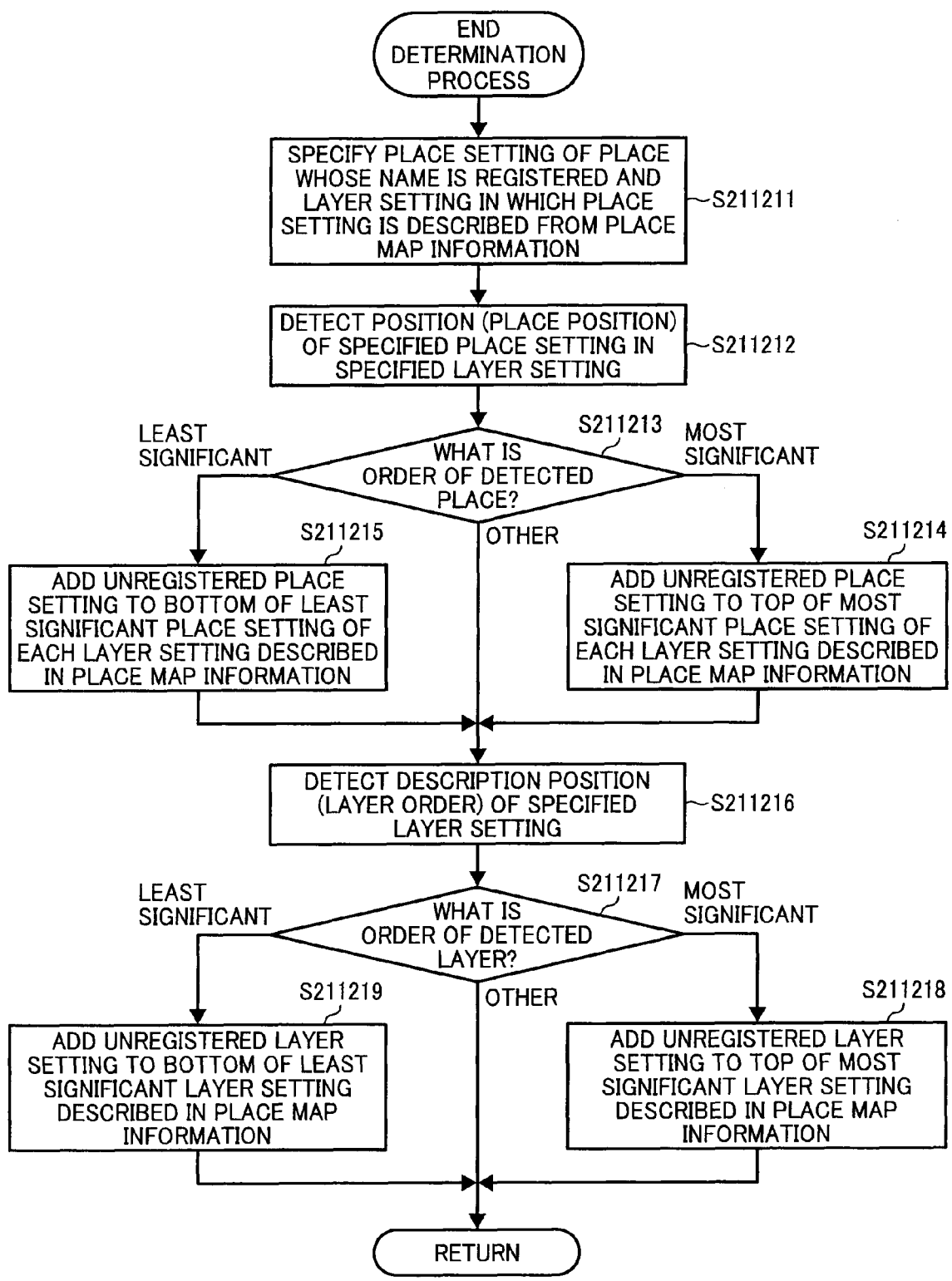
FIG. 12 is a flowchart of an end determination process.
Figure 13:
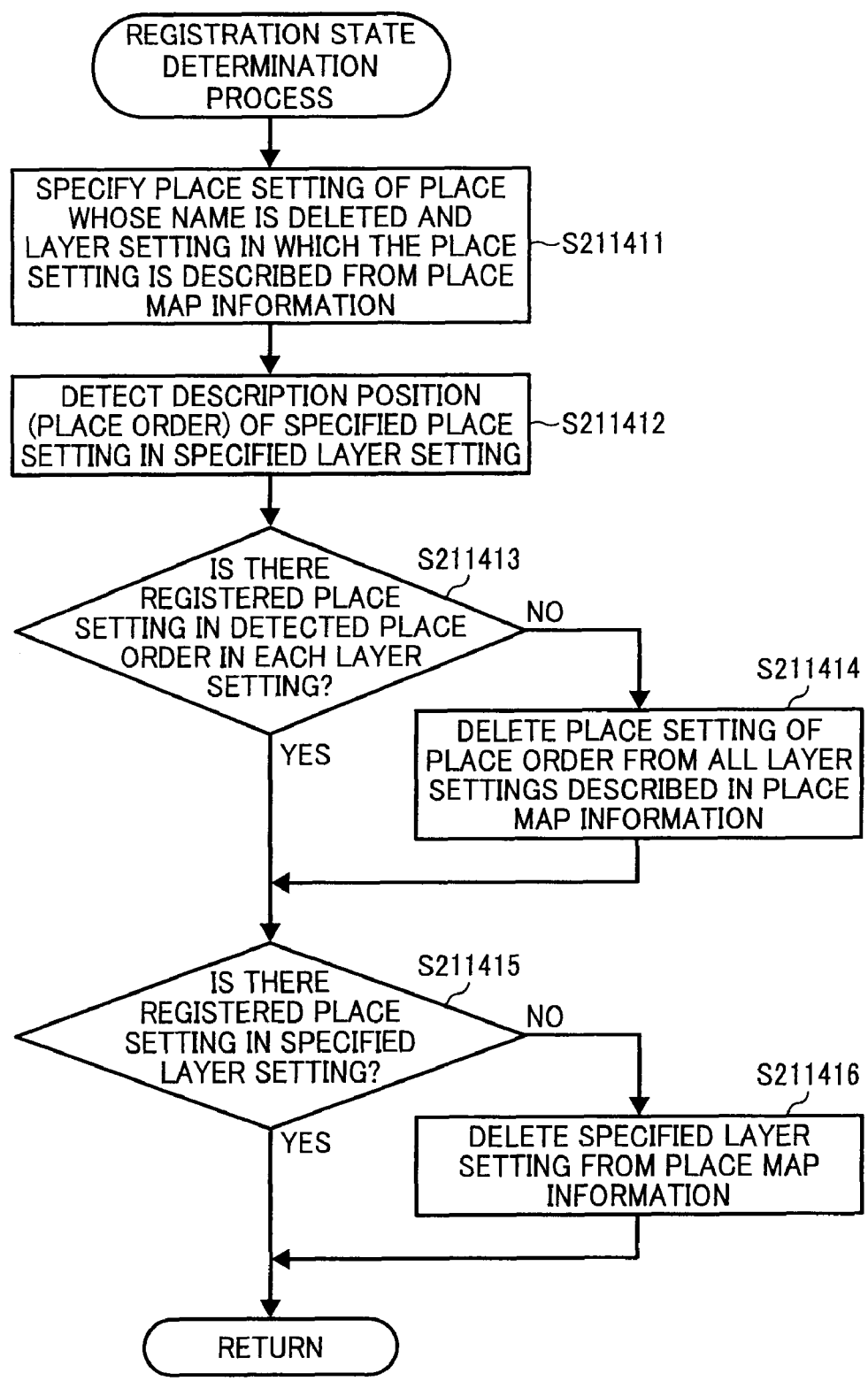
FIG. 13 is a flowchart of a registration state determination process.

Hereinafter, it will be explained about the place matrix reconfiguration process performed at Step S119 illustrated in FIG. 8 with reference to FIGS. 11 to 13. FIG. 11 is a flowchart of the place matrix reconfiguration process. First, the place matrix reconfiguring unit 414 (FIG. 5) of the file management server 400 determines whether the registration for the place name is to be performed (Step S2111). When it is determined that the registration is not to be performed (No at Step S2111), the process control proceeds to Step S2113.

On the other hand, when it is determined that the registration is to be performed (Yes at Step S2111), the place matrix reconfiguring unit 414 executes an end determination process (FIG. 12), which is described below in detail, based on the place setting 202 (FIG. 4) of the place whose the name is registered (Step S2112).

Next, the place matrix reconfiguring unit 414 determines whether the deletion for the place name is to be performed (Step S2113). When it is determined that the deletion is not to be performed (No at Step S2113), the process control proceeds to Step S120 (FIG. 8).

On the other hand, when it is determined that the deletion is to be performed (Yes at Step S2113), the place matrix reconfiguring unit 414 executes a registration state determination process (FIG. 13), which is described below in detail, based on the place setting 202 of the place whose the name is deleted (Step S2114).

The place information (the placeID folder: FIG. 3) of which the setting contents are modified in the place matrix reconfiguration process is sent to the client terminal 500 at Step S120 illustrated in FIG. 8.

Next, it will be explained about the end determination process performed at Step S2112 illustrated in FIG. 11. FIG. 12 is a flowchart of the end determination process performed at Step S2112. First, the place matrix reconfiguring unit 414 specifies the place setting 202 corresponding to the place whose the name is registered and the layer setting 201 in which the place setting 202 is described, from place map information (placeMap.xml: FIG. 3) (Step S211211).

Next, the place matrix reconfiguring unit 414 detects the position of the specified place setting 202, that is to say, an order (a place order), which is described in the layer setting 201 specified at Step S211211 (Step S211212).

Next, the place matrix reconfiguring unit 414 confirms the order of the place detected at Step S211212. When it is determined that the order of place is the most significant (most significant at Step S211213), the place matrix reconfiguring unit 414 respectively adds unregistered place settings 202 to the top of the most significant place settings 202 in the layer settings 201 described in the place map information (placeMap.xml: FIG. 3) (Step S211214), and the process control proceeds to Step S211216.

On the other hand, when it is determined that the detected place order is the least significant (least significant at Step S211213), the place matrix reconfiguring unit 414 respectively adds unregistered place settings 202 to the bottom of the least significant place settings 202 in the layer settings 201 described in the place map information (placeMap.xml: FIG. 3) (Step S211215), and the process control proceeds to Step S211216.

Meanwhile, when it is determined that the detected place order is an order other than the most significant or the least significant (the other at Step S211213), the process control promptly proceeds to Step S211216.

Next, the place matrix reconfiguring unit 414 detects the position of the layer setting 201 specified at Step S211211, that is to say, an order (a layer order), which is described in the place map information (placeMap.xml: FIG. 3) (Step S211216).

Next, the place matrix reconfiguring unit 414 confirms the order of layer detected at Step S211216. When it is determined that the layer order is the most significant (most significant at Step S211217), the place matrix reconfiguring unit 414 adds the unregistered layer setting 201 to the top of the most significant layer setting 201 described in the place map information (placeMap.xml: FIG. 3) (Step S211218), and the process control proceeds to Step S2113 illustrated in FIG. 11.

On the other hand, when it is determined that the layer order is the least significant (least significant at Step S211217), the place matrix reconfiguring unit 414 adds the unregistered layer setting 201 to the bottom of the least significant layer setting 201 described in the place map information (placeMap.xml: FIG. 3) (Step S211219), and the process control proceeds to Step S2113 illustrated in FIG. 11.

Meanwhile, when it is determined that the layer order is an order other than the most significant or the least significant (the other at Step S211217), the process control proceeds to Step S2113 illustrated in FIG. 11.

As described above, when a new place name is registered, it is determined whether the place of which the name is registered is located in the end (the most significant or the least significant of the place order or the layer order) of the place matrix. Based on the determination, the new place setting 202 and the new layer setting 201 are added and the place map matrix (FIG. 14) is expanded.

Next, it will be explained about the registration state determination process performed at Step S2114 illustrated in FIG. 11. FIG. 13 is a flowchart of the registration state determination process performed at Step S2114. First, the place matrix reconfiguring unit 414 specifies the place setting 202 corresponding to the place of which the name is deleted and the layer setting 201 in which the place setting 202 is described, from the place map information (Step S211411).

Next, when the place matrix reconfiguring unit 414 detects the position of the specified place setting 202, that is to say, the order of place, which is described in the layer setting 201 specified at Step S211411 (Step S211412), the place matrix reconfiguring unit 414 determines whether the place setting 202 of which the place name has been registered is present in the place setting 202 in each the layer setting 201 corresponding to the place order (Step S211413). In this case, when it is determined that the place setting 202 of which the place name has been registered is present (Yes at Step S211413), the process control promptly proceeds to Step S211415.

On the other hand, when it is determined that the place setting 202 of which the place name has been registered is not present (No at Step S211413), the place matrix reconfiguring unit 414 deletes the place setting 202 corresponding to the detected place order from all the layer settings 201 described in the place map information (Step S211414), and the process control proceeds to Step S211415.

Next, the place matrix reconfiguring unit 414 determines whether the place setting 202 of which the place name has been registered is present in the layer setting 201 specified at Step S211411 (Step S211415). In this case, when it is determined that the place setting 202 of which the place name has been registered is present (Yes at Step S211415), the process control promptly proceeds to Step S120 (FIG. 8).

On the other hand, when it is determined that the place setting 202 of which the place name has been registered is not present (No at Step S211415), the place matrix reconfiguring unit 414 deletes the layer setting 201 specified at Step S2141 from the place map information (Step S211416), and the process control proceeds to Step S120 (FIG. 8).

As described above, when the place name is deleted and another place name is not registered in the same place row or place column as that of the place of which the name is deleted, the place setting 202 or the layer setting 201 is deleted and the place map matrix is reduced (see FIG. 14).

As described above, when registration information for a new place is sent from the client terminal 500 that cannot handle the place map information (placeMap.xml), the file management server 400 retrieves a place close to the center based on the place map information and registers the registration information for the new place. Therefore, the addition of the place row or place column to the place map can be prevented as much as possible, and thus the expansion of an unnecessary place matrix can be suppressed.

The file management system 100 according to the present embodiment retrieves a vacant place located at the shortest distance from the center to register a new place in the layer setting and the place setting close to the center in the configuration information updating process illustrated in FIG. 9. However, the configuration is not limited to this. If the expansion of an unnecessary place matrix can be suppressed, it is not necessary to closely perform a shortest-distance computing process. For example, the CPU 41 of the file management server 400 illustrated in FIG. 2 determines whether a vacant place is present in places excepting places located in the end of the place matrix. When the vacant place is present, the setting modification receiving unit 513 sequentially performs the registration on the vacant places from the upper or lower layer than that of the vacant place. When the vacant place is not present, the setting modification receiving unit 513 performs the registration on any of the vacant places located in the end of the place matrix.

As described above, according to an aspect of the present invention, file management can be effectively performed on a place map and the convenience of apparatus can be improved even when a new place is created without the use of dedicated software.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A file management system, comprising:
a plurality of client terminals and a file management apparatus that is connected to the client terminals via a network, each client terminal including
a first sending unit that sends a file to the file management apparatus; and
a second sending unit that sends a generation request for generation of file management information for managing the file to the file management apparatus, and
the file management apparatus including
a generating unit that generates the file management information upon receiving the generation request from the client terminal;
a first storage unit that receives the file from the client terminal, and stores therein the file, the file management information associated with the file, and position information by which a displaying unit displays symbol images for the file management information in a shape of a matrix;
a display control unit that causes the displaying unit to display the symbol images in the shape of the matrix based on the stored position information;
a determining unit that determines whether first position information that is not associated with the file management information is present, excepting second position information corresponding to an end of the matrix, among the stored position information of the symbol images that are displayed in the shape of the matrix; and
a computing unit that computes distances, from a center of the matrix, of the symbol images displayed in the shape of the matrix,
wherein the generating unit generates the file management information in association with closest position information having a computed smallest distance among the stored position information, when the determining unit determines that the first position information is present.

2. The file management system according to claim 1, wherein
the second sending unit sends identification information for identifying the client terminal along with the generation request;
the first storage unit stores each symbol image according to a type of the client terminal; and
the display control unit causes the displaying unit to display the symbol images according to the type of the client terminal in accordance with the stored position information associated with the generated file management information, based on the identification information.

3. A file management apparatus connected to a plurality of client terminals via a network, the file management apparatus comprising:
a generating unit configured to generate file management information upon receiving a generation request for generation of file management information for managing a file from the client terminal;
a first storage unit configured to receive a file from the client terminal, and to store therein the file, the file management information associated with the file, and position information by which a displaying unit displays symbol images for the file management information in a shape of a matrix;

a display control unit configured to cause the displaying unit to display the symbol images in the shape of the matrix based on the stored position information;

a determining unit configured to determine whether first position information that is not associated with the file management information is present, excepting second position information corresponding to an end of the matrix, among the stored position information of the symbol images that are displayed in the shape of the matrix; and a computing unit configured to compute distances, from a center of the matrix, of the symbol images displayed in the shape of the matrix, wherein the generating unit is configured to generate the file management information in association with closest position information having a computed smallest distance among the stored position information, when the determining unit determines that the first position information is present.

4. A file management method, comprising:

generating file management information upon receiving a generation request for generation of file management information for managing a file;

receiving a file from the client terminal, and storing therein the file, the file management information associated with the file, and position information by which a displaying unit displays symbol images for the file management information in a shape of a matrix;

causing the displaying unit to display the symbol images in the shape of the matrix based on the stored position information;

determining whether first position information that is not associated with the file management information is present, excepting second position information corresponding to an end of the matrix, among the stored position information of the symbol images that are displayed in the shape of the matrix; and computing distances, from a center of the matrix, of the symbol images displayed in the shape of the matrix, wherein the generating step includes generating the file management information in association with closest position information having a computed smallest distance among the stored position information, when the determining step determines that the first position information is present.

* * * * *